United States Patent
Asbery

[15] 3,682,013
[45] Aug. 8, 1972

[54] GEAR CHANGE MECHANISM
[72] Inventor: John Harrison Asbery, 87 Oakington Manor Drive, Wembley, Middlesex, England
[22] Filed: March 4, 1971
[21] Appl. No.: 121,103

[30] Foreign Application Priority Data

March 7, 1970 Great Britain..........11,038/70

[52] U.S. Cl.................................................74/335
[51] Int. Cl...............................................F16h 5/06
[58] Field of Search..........................74/335, 337.5

[56] References Cited

UNITED STATES PATENTS

| | | | |
|---|---|---|---|
| 2,346,820 | 4/1944 | Casler et al. | 74/335 |
| 2,917,936 | 12/1959 | Fletcher | 74/335 X |
| 2,931,237 | 4/1960 | Backus | 74/335 |
| 3,053,102 | 9/1967 | Alfieri | 74/335 |

*Primary Examiner*—Arthur T. McKeon
*Attorney*—Holman & Stern

[57] ABSTRACT

Gear change mechanism for a vehicle multi speed gearbox includes a driver operable lever movable within a gate, there being associated with the lever a disc. The disc is provided with two pairs of projections with which are associated baulk devices respectively, and these devices are operated so as to prevent movement of the lever into the neutral or gear engaged position until the selector mechanism of the gearbox has moved to the appropriate position. This provides an indication to the driver particularly in systems where the gearbox is remote from the driver, that the selector mechanism of the gearbox is in a particular position.

9 Claims, 3 Drawing Figures

INVENTOR
John Harrison Asbery

GEAR CHANGE MECHANISM

This invention relates to gear change mechanism for a vehicle multi speed gearbox and of the kind including a gear box selector lever movable to effect engagement of a particular ratio, first and second powered devices for effecting movement of the selector lever in directions substantially at right angles and a driver operable control lever for controlling the operation of said powered devices.

With such a mechanism it is possible for the control lever to be moved more quickly by the driver than the selector lever can be moved by the powered devices with the result that when it is required that the selector lever be moved in two directions there is possibility of engagement of the wrong ratio or no ratio at all.

The object of the invention is to provide such a mechanism in a simple and convenient form. According to the invention in a mechanism of the kind specified there is provided in association with the selector lever sensing means which are operated when a stage in the movement of the selector lever is completed, said sensing means serving to provide a signal to the driver indicative of when the next stage in the movement of the selector lever can take place.

One example of a gear change mechanism in accordance with the invention will now be described with reference to the accompanying drawings in which.

Figure 1:
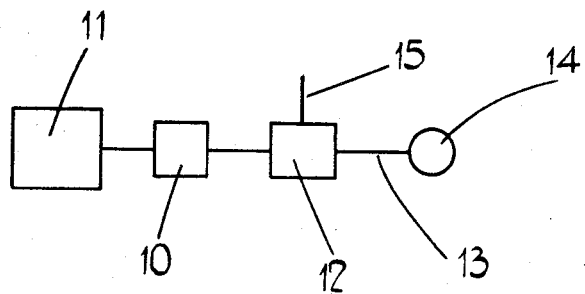
FIG. 1 is a schematic layout of a vehicle transmission system.

With reference to the drawings the transmission system includes a driver operable clutch 10 which is disposed intermediate the engine 11 of the vehicle and a multi ratio gearbox 12. The output shaft of the gearbox is connected to a transmission shaft 13 and through which power is transmitted to the driven road wheels 14 of the vehicle.

Figure 2:
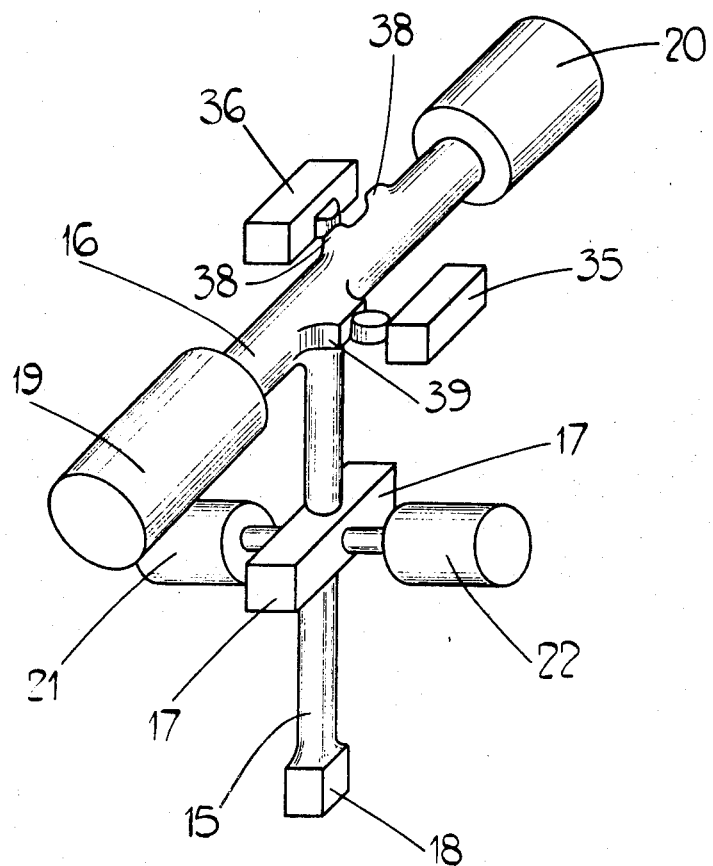
FIG. 2 is a perspective diagrammatic view of the gearbox operating mechanism.

The gearbox includes a selector lever 15 which in known manner, is movable in a gate to determine which ratio of the gearbox is engaged. As shown in FIG. 2 the selector lever 15 comprises an elongated arm which depends substantially at right angles, from a transverse arm 16. Intermediate its ends the lever 15 is provided with lateral projections 17 extending parallel to the arm 16 and at its lower end it is provided with a peg 18 which forms part of the selector mechanism of the gearbox. The lever 15 and the transverse arm 16 are angularly movable about the longitudinal axis of the arm 16 and in addition the arm 16 is movable along its longitudinal axis.

For effecting longitudinal movement of the transverse arm 16. Conveniently each actuator comprises a fluid pressure operable piston cylinder combination and two combinations work in opposition so that when fluid under pressure is applied to both combinations the arm 16 will assume an intermediate position. In like manner for effecting angular movement of the lever 15 a pair of actuators 21, 22 are provided. These actuators are also of the fluid pressure operable type and their operating members bear upon the lever 15 in the region of the lateral projections 17. As with the actuators 19, 20 when fluid under pressure is applied to both actuators 21, 22 the lever 15 is moved to the intermediate position.

Figure 3:
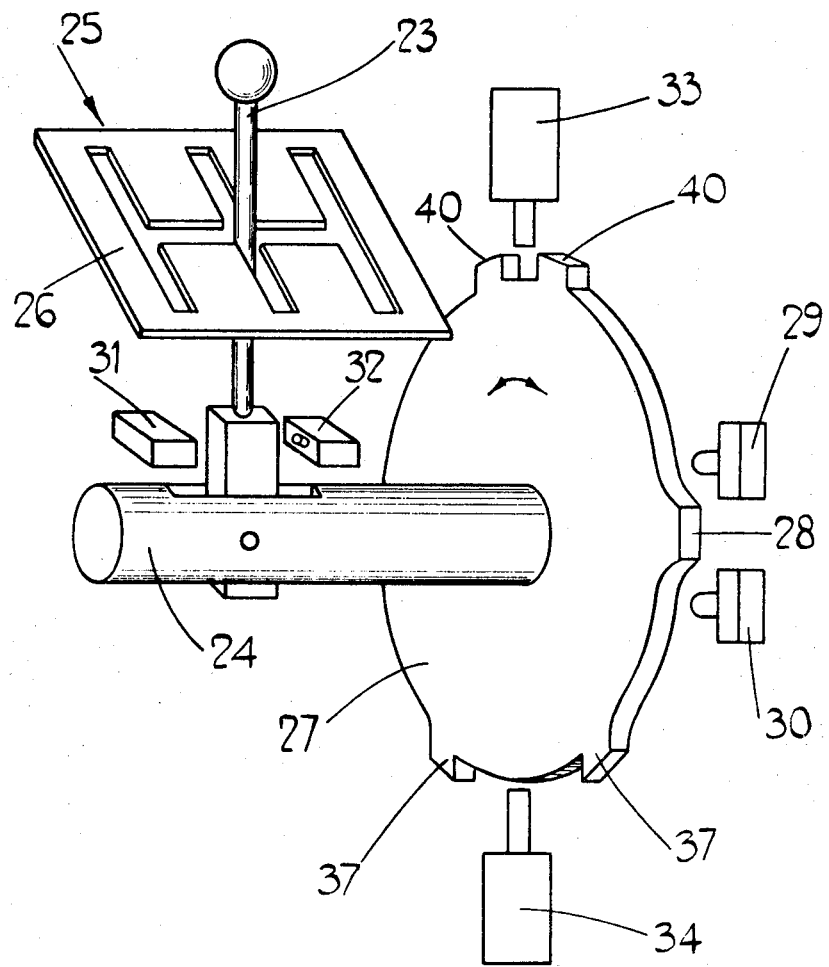
FIG. 3 is a perspective diagrammatic view of the drivers control mechanism.

Turning now to FIG. 3; this shows a driver operable lever 23 which is pivotally mounted at its lower end within an axial slot formed in an angularly movable shaft 24. The lever 23 is mounted on the shaft 24 for angular movement in a plane including the longitudinal axis of the shaft 24 and the movement of the lever 23 is constrained by a gate 25 comprising a plate 26 having slots formed therein. The slots are arranged in the conventional fashion and as will be seen 6 alternative positions are provided for the lever 23 and corresponding to five forward ratios and one reverse.

Mounted on the shaft 24 is a disc 27 and formed on the disc is a projection 28 positioned to operate a pair of fluid control valves 29, 30. In the position shown the control members of the valves are clear of the projections 28 however, as the driver operable lever 23 is moved to effect angular movement of the shaft 24 one or the other of the valves 29, 30 will be operated. The valve 30 controls the application of fluid under pressure to the actuator 20 whilst the valve 29 controls the application of fluid under pressure to the actuator 19. If valve 29 is operated the supply of fluid under pressure to the actuator 19 will be cut off and so the actuator 20 will move the arm 16. In the event that the valve 30 is operated then the arm 16 will move in the opposite direction.

In addition the driver operable lever 23 has associated therewith a pair of fluid control valves 31, 32 and these control the supply of fluid under pressure to the actuators 21 and 22 respectively and depending upon which of the valves is operated the lever 15 will be moved in the appropriate direction.

With the system as described there is no feed back between the lever 15 and the lever 23 and whilst this may not matter if the changes of ratio are effected slowly it will be difficult for the driver when trying to make a rapid change of ratio to know when it is safe to re-engage the clutch.

To overcome this problem there is associated with the disc 27 a pair of baulk devices 33, 34, each of which includes a stem movable into the paths of projections formed on the periphery of the disc. The baulk devices are operated by fluid under pressure the supply of which to the devices is controlled by valves 35 and 36 respectively which are controlled by cams on the arm 16.

Considering the device 34, the stem thereof co-operates with a pair of circumferential projections 37 formed on the disc 27. The associated control valve 36 is provided with an operating member which is depressed in the extreme position of the arm 16 by cams 38 formed on the arm 16. Moreover, the projections 37 are spaced by an amount sufficient to allow one or the other of the valves 29, 30 to be operated when the driver operable lever 23 is moved in the slots. At the same time however the projections 37 prevent full movement of the lever. In operation therefore from the neutral position if the lever is moved into one of the slots valves 29 or 30 will be operated to effect movement of the arm 16. The stem of the baulk device 34 will be in the extended position as shown and will contact one of the projections 37 to prevent further movement of the disc and lever. However, when the valve 36 is operated by one or the other of the cams 38 the baulk device 34 will be energized and the disc is then free to move. This provides by virtue of the fact that the selector lever 23 can now move fully, an indication to the driver that the gear ratio is selected and that he can re-engage the clutch.

Considering now the device 33. The operation of this device is controlled by the valve 35 and this in turn is operated by a single cam 39 provided on the arm 16. In the neutral position of the lever 15 the operating member of the valve 35 is contacted by the cam 39 and the stem of the baulk device 33 is in the retracted position shown. Formed on the periphery of the disc 27 are a pair of projections 40 the circumferential outer surfaces of which are contacted by the stem of the device 38 as will be described. Assume that a gear ratio is engaged then the stem of the device 38 will be extended however, the projections 40 are positioned such that movement of the driver operable lever 23 towards the neutral position will effect release of one or the other of the valves 29, 30, to cause movement of the arm 16 towards the neutral position. The full extent of the movement of the lever 23 is prevented until the arm 16 moves into the neutral position. In this position the cam 39 operates the valve 35 and the device 33 is actuated to withdraw the stem from one of the projections 40 and this permits the movement of the lever 23 into the neutral position. Thus the driver is provided with an indication of when the clutch can be re-engaged.

It will be appreciated that not only is the driver provided with an indication of the position of the gearbox selector lever, but also he is positively prevented from selecting a gear until the gearbox selector 15 is in the correct position. In this manner the risk of the levers 23 and 15 becoming out of phase is minimized. Furthermore, whilst the devices 33 and 34 in the example described are operated by fluid pressure, they can be electromagnetically operated in which case the valves 35 and 36 would be replaced by electric switches.

Having thus described my invention what I claim as new and desire to secure by Letters Patent is:

1. Gear change mechanism for a vehicle multi speed gearbox and including a gearbox selector lever movable to effect engagement of a particular ratio, first and second powered devices for effecting movement of the selector lever in directions substantially at right angles, a driver operable control lever for controlling the operation of said powered devices, and sensing means associated with the selector lever and which is operated when a stage in the movement of the selector lever is completed and said sensing means serving to provide a signal to the driver of when the next stage in the movement of the selector lever can take place.

2. Gear change mechanism as claimed in claim 1 including baulk mechanism operable by said sensing means to prevent movement of the driver operable lever until the stage in the movement of the selector lever is completed.

3. Gear change mechanism as claimed in claim 1 in which said sensing means comprises a pair of sensing members, one of which senses when the selector lever is in the neutral position and the other of which senses when the selector lever is in a ratio engaged position.

4. Gear change mechanism as claimed in claim 3 including a pair of baulk mechanisms operated by said sensing members respectively.

5. Gear change mechanism as claimed in claim 4 in which said one sensing means and its associated baulk mechanism acts to prevent the driver operable lever being moved fully into its neutral position until said selector lever is in the neutral position.

6. Gear change mechanism as claimed in claim 5 in which said other sensing means and its associated baulk mechanism acts to prevent the driver operable lever being moved fully into the gear engaged position until the selector lever is in a gear engaged position.

7. Gear change mechanism as claimed in claim 6 including a disc coupled to the driver operable selector lever so as to move angularly as the selector lever is moved towards the gear ratio selector positions, each baulk mechanism including a pair of surfaces defined on the disc and with which co-operate a movable stem forming part of the baulk mechanism.

8. Gear change mechanism as claimed in claim 7 including a projection on said disc for operating a pair of control valves, said control valves controlling the operation of the one of said powered devices which effects movement of the selector lever into the gear engaged position.

9. Gear change mechanism as claimed in claim 8 including a further pair of control valves operable by movement of the driver operable lever in the neutral plane, said further pair of control valves controlling the operation of said other powered device.

* * * * *